United States Patent [19]
Buckland et al.

[11] Patent Number: 6,064,652
[45] Date of Patent: May 16, 2000

[54] CELL GRANT MECHANISM

[75] Inventors: Kenneth M. Buckland, Rohnert Park; Thomas R. Eames, Santa Rosa; Lac X. Trinh, Rohnert Park; Steven D. Warwick, Santa Rosa, all of Calif.

[73] Assignee: Next Level Communications, Rohnert Park, Calif.

[21] Appl. No.: 08/749,913

[22] Filed: Nov. 13, 1996

Related U.S. Application Data

[60] Provisional application No. 60/006,953, Nov. 17, 1995.

[51] Int. Cl.[7] ............................ G01R 31/08; G06F 11/00; G08C 15/00
[52] U.S. Cl. ............................................. 370/235; 370/252
[58] Field of Search ..................................... 370/229–230, 370/231–232, 233–234, 235–236, 412, 413, 252–253; 395/2, 602, 750, 849; 709/226; 710/29, 39

[56] References Cited

U.S. PATENT DOCUMENTS

| | | | |
|---|---|---|---|
| 5,258,979 | 11/1993 | Oomuro et al. | 370/232 |
| 5,432,824 | 7/1995 | Zheng et al. | 370/232 |
| 5,511,204 | 4/1996 | Crump et al. | 395/750 |
| 5,528,591 | 6/1996 | Lauer | 370/232 |
| 5,602,830 | 2/1997 | Fichou | 370/232 |
| 5,677,906 | 10/1997 | Hayter et al. | 370/235 |
| 5,704,047 | 12/1997 | Schneeberger | 370/229 |
| 5,822,612 | 9/1996 | Thomas et al. | 395/826 |

*Primary Examiner*—Chi H. Pham
*Assistant Examiner*—Steven Nguyen
*Attorney, Agent, or Firm*—J.P. Blasko Professional Corp.; Charles A. Eldering; John P. Blasko

[57] ABSTRACT

A cell grant mechanism is presented which allows a central device to control the transmission of cells from one or more remote devices connected to the central device over a physical medium. Grants are issued from a grant table in the central device to allow remote devices to transmit cells to the central device. The spacing of the grants are optimized to minimize cell delay variation. When there are unused cell opportunities, central device can issue grants to devices to utilize the unused cell opportunities on an available bit rate basis.

8 Claims, 7 Drawing Sheets

```
for(i = 0; i < newGrants; i++) { int optimumLocation = round(i * 4 * k / n);   /* optimum location */ int dither = 0;
    int ifound = 0;

do {
        int hival = (optimumLocation + dither) % GRANT_TABLE_SIZE;
        int loval = (GRANT_TABLE_SIZE
                        + optimumLocation
                        - dither) % GRANT_TABLE_SIZE;

if (grantTable[hival] == 15) {           /* check ahead */
            grantTable[hival] = deviceID;
            ifound = 1;
            continue ;    /* skip to end of do */
        };

if (grantTable[loval] == 15) {           /* check behind */
            grantTable[loval] = deviceID;
            ifound = 1;
            continue ;    /* skip to end of do */
        };

dither++;

} while (ifound == 0 && dither <= round(4 * k / n));

```
index = 0
last = 1
endless loop:
    grant = grantTable[index]                          /* read grant from grant table */
    if (Xon = "true" and grant = 15):                  /* if no device is being issued a grant */
        next = last
        do:
            next = next + 1                            /* progress through devices */
            if (next = 15) next = 1                    /* last device is device 14 */
            if (queueTable[next] ≠ 0):                 /* if there is data in that device queue, */
                grant = last = next                    /* issue a grant to that device */
                queueTable[next] = queueTable[next] - 1  /* decrement queue table */
        while (next ≠ last)
    index = index + 1
    if (index = 4k) index = 0
```

/* 14 devices in residence to be addressed */

FIG. 7

CELL GRANT MECHANISM

CROSS-REFERENCES

This application claims the benefit of U.S. Provisional Application No. 60/006,953 filed Nov. 17, 1995 entitled "Cell Grant Mechanisms in ATM Based Systems," of which Kenneth M. Buckland, Steven D. Warwick, Thomas R. Eames, and Lac X. Trinh and are the inventors.

FIELD OF THE INVENTION

The field of the invention is telecommunications, and more specifically, the use of Asynchronous Transfer Mode (ATM) technology to transport cell based information over a physical medium (layer) in which a single network point connects to one or more devices over a bi-directional communications network. The invention specifically relates to when devices on the ATM network are allowed to transmit data, so that best utilization of the communications resources (bandwidth) is made.

BACKGROUND OF THE INVENTION

In ATM distribution systems, the physical layer is defined as a functional group comprised of hardware, software and transmission media which converts an ATM cell stream into bits to be transported over the transmission media. The physical layer supports the transmission and reception of these bits. Examples of transmission media are optical fiber, coaxial cable, free space, and twisted copper pairs.

In many cases the network is configured in a point-to-multipoint or bus configuration on a shared media, where several devices receive from and transmit to a single station. Examples of a shared media include free space propagation such as in radio systems, where a base station communicates with a number of remote stations, or a computing network in a small business in which all of the terminals are connected to a central server by a single pair of wires running throughout the building.

ATM networks transfer information in the form of cells. These cells contain both a data field and a header field. The data field contains user data, while the header field contains routing/identification and error control fields. Packet based networks transmit information in the form of packets which have similar structures to the cells in ATM networks. When used herein, the term cell refers to any type of cell or packet in a communications network.

In cell based networks, devices are granted permission to transmit one or more cells from a buffer which contains cells awaiting transmission. The permission can be in the form of a grant, which allows the device to transmit a cell in an upcoming opportunity. The term cell opportunity, when used herein, refers to an allocation of time or frequency which can be used to transmit a cell. For networks which are based on a form of time division multiplexing or time division multiple access, a grant can be received in a frame which indicates that a cell opportunity in a subsequent frame can be used.

In an ATM network, connections are established between devices on that network and are termed Virtual Circuits (VCs). The virtual circuits have parameters associated with them which indicate the data rate the virtual circuit provides and the type of service. The type of services which can be provided include Constant Bit Rate (CBR), Variable Bit Rate (VBR) or Available Bit Rate (ABR) transport on a virtual circuit. These virtual circuits can exist between devices on the shared media and a central receiving point, as well as on point-to-point connections.

When a virtual circuit is established between two points in an ATM network, there are characteristics which are associated with that virtual circuit. One characteristic is the data rate for the virtual circuit. The data rate for the virtual circuit will establish how frequently cells are transmitted.

Simultaneously with the development of ATM technology, there have been advances in Fiber-to-the-Curb (FTTC) technology in which devices are connected to the telephone central office via a network of optical fibers connecting the central office to single network points called Optical Network Units (ONUs) which in turn connect to the subscriber residence via a coaxial cable, and to the devices in the residence via a passive splitter and in-home coaxial wiring. In these FTTC networks, signals can be routed to the residence via a single coaxial cable connecting the residence to the ONU, but the passive network in the home results in a shared media, with all of the devices in the residence needing to transmit over a single coaxial cable.

One of the goals of the present invention is to provide one or more embodiments which permit the transport of ATM cells over a point-to-point and point-to-multipoint networks in a manner such that devices on that network are issued grants to transmit cells to the ONU, and that these grants are allocated in a manner that guarantees that the virtual circuits that have been established between the central station and the devices have the Constant Bit Rate (CBR), Variable Bit Rate (VBR) or Available Bit Rate (ABR) services that they have contracted for in the system, according to the parameters specified in the Quality of Service (QoS) associated with each of the virtual circuits. The QoS defines the basic parameters of the VC including the cell loss rate and average delay.

Another goal of the invention is to provide a method for issuing grants such that cells associated with CBR services have a minimum variation between cells, resulting in a low Cell Delay Variation (CDV).

These and other features and objects of the invention will be more fully understood from the following detailed description of the preferred embodiments which should be read in light of the accompanying drawings.

SUMMARY OF THE INVENTION

A method for allocating bandwidth in a cell based communications system is presented in which a grant table is constructed which contains grants to allow one or more remote devices connected to a central device to transmit cells. The number of grants required for a particular device and VC is calculated and the optimum locations for those grants in the grant table are calculated. The optimum locations are those locations which space the grants evenly and minimize cell delay variation.

In the event that grants already exist in the desired locations, an offset is applied to the desired locations and alternate locations which minimize cell delay variation are calculated.

Devices that have information which can be transmitted on an ABR virtual circuit transmit the number of cells they have awaiting transmission to the central location which maintains that information in a queue table. When the central device has one or more locations in the grant table which are unused, remote devices having cells awaiting transmission are issued grants. This is accomplished by examining the queue table and determining that a device has one or more cells awaiting transmission and issuing that device one or more grants. In the event that there are multiple devices communicating with the central device, the queue tables for each device are examined sequentially to determine if there are cells awaiting transmission and to issue grants to those devices.

The central device can also be connected to a master device which may not have the bandwidth to accommodate all of the cells being transmitted from the devices to the central device and which will be subsequently transmitted to the master device. A signal can be issued from the master device to the central device which prohibits the further issuance of ABR grants to the devices connected to the central device and which therefore prevents the overflow of memories or First-In-First-Out registers in the master device.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 6 illustrates an algorithm for grant location optimization.

FIG. 7 illustrates an algorithm for the allocation of ABR grants.

DETAILED DESCRIPTION OF THE PREFERRED EMBODIMENT

Figure 1:
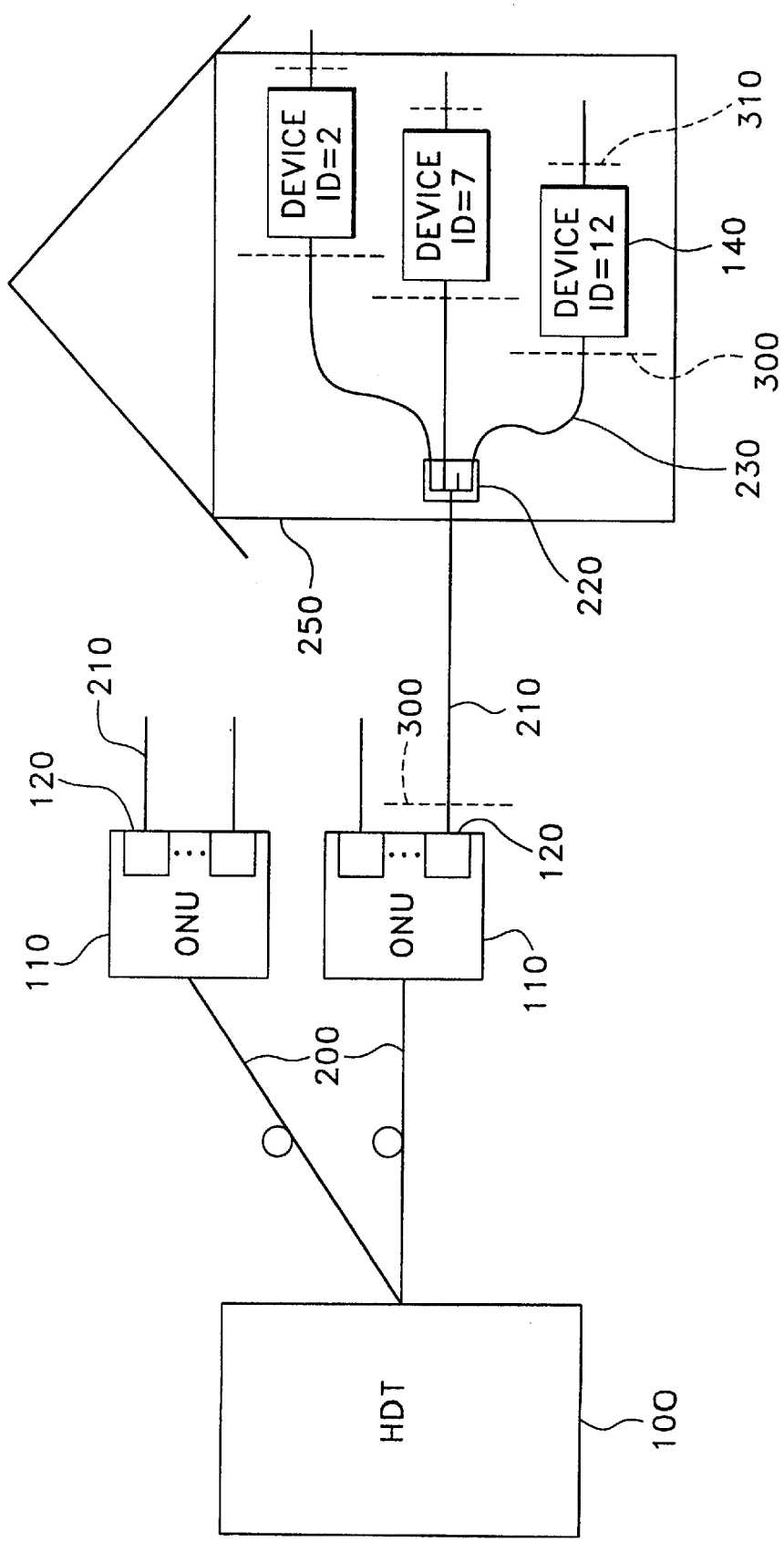
FIG. 1 shows a Fiber-to-the-Curb network with a point-to-multipoint coaxial network connecting the Optical Network Unit (ONU) with devices in the residence.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

One embodiment of the present invention is directed to a method of allocating bandwidth to devices on a point-to-multipoint or shared media, such that different types of services including CBR, VBR and ABR can be provided, and that CBR and VBR services have a minimum of CDV.

To allow the various types of services, including CBR, VBR, and ABR services, to be transmitted upstream over a shared media, a grant table is utilized in the central receiving point (ONU). The grant table issues grants to the devices so that they can transmit their upstream cells. The grant table is composed of memory which contains the identification (ID) number of the device which is being granted permission to transmit a cell during any given transmission opportunity. The grant table is read continuously, and the device IDs form grants which are transmitted in the downstream (ONU to device) direction. The devices, upon observing grants containing their IDs, will transmit a cell to the central receiving point (ONU).

The grant table can be constructed by utilizing the peak cell rate (PCR) value for the CBR and VBR virtual circuits associated with a device, and the minimum cell rate (MCR) for ABR virtual circuits associated with that device. The grant table can be programmed such that devices which need CBR and VBR services periodically receive grants to maintain the PCR, and that variation between the grants is minimized. This results in CBR and VBR services with a minimum of CDV.

The grants that are available after PCR and MCR requirements have been met can be used for ABR virtual circuits by issuing these grants to devices which have indicated that they have cells stored and ready to be transmitted. The mechanism in which available grants are allocated consists of monitoring the number of cells each device has stored for transmission, and keeping this information in a queue table at the central receiving point (ONU). If there are cells ready for transmission from the devices, the grant table will indicate so, and an ABR grant generator uses this information to determine which device should be issued a grant. In this way grants not needed for CBR and VBR services are used for ABR services, and the capacity of the channel is used to the fullest extent possible.

One embodiment of the invention is its use on a FTTC network in which the coaxial drop cable from a central receiving unit is connected to a number of devices in a residence. The grant table is located in the central receiving unit, and grants are issued to the devices in the residence such that the QoS for Virtual circuits from the device to the central receiving unit are maintained.

FIG. 1 illustrates a Fiber-to-the-Curb (FTTC) network which delivers telecommunications services to a residence 250. Services are provided in the FTTC network shown in FIG. 1 via a Host Digital Terminal 100 which is connected to an Optical Network Unit 110 via an optical fiber 200. The connection to the residence 250 is made by a ONU physical layer transceiver 120 which is connected by a coaxial drop cable 210 to a splitter 220 which is connected to one or more devices 140 via in-home coaxial cable 230. One or more residences can be served by ONU 110. In a preferred embodiment eight residences 250 are served by ONU 110.

Although the preferred embodiment utilizes a coaxial drop cable 210, a number of alternate media can be used to connect ONU 110 with residence 250. This includes wireless transmission and transmission over twisted pair. Transmission media and techniques for this connection are well understood by those skilled in the art. Similarly, the transmission media in the residence 250 is not limited to coaxial cable.

In the FTTC system digital signals are used to carry voice, video, and data signals to the devices. Asynchronous Transfer Mode (ATM) protocols and formats can be used to carry the signals. The system requires bi-directional communications between the devices in the residence 250 and the ONU 110. Information is transmitted in the upstream direction, for example, from the devices 140 to the ONU 240. Via the Universal Test & Operations PHY Interface for ATM (UTOPIA) interface 310, the devices 140 can be connected to a number of types of terminal equipment including televisions, telephones, and computers.

The system provides for the transport of ATM cells in the upstream direction as well as the downstream (ONU to devices) direction. The relevant interfaces for this network are illustrated in FIG. 1 and are the User Network Interface (UNI) interface 300 on the coaxial cable and the UTOPIA interface 310 at the output of the device.

The devices in the residence 250 are connected to ONU physical layer transceiver 120 via a subscriber coaxial cable network, which when used herein, is defined as a network comprised of a coaxial drop cable 210, splitter 220, and in-home coaxial wiring 230, which connects an individual residence 250 to the ONU physical layer transceiver 120. Use of the term subscriber indicates that the customer in the residence is a subscriber or potential subscriber to the services provided over the FTTC telecommunications network. The subscriber coaxial cable network forms a shared media since it allows all devices 140 connected to it to access the ONU physical layer transceiver 120 with no active switching.

Since the subscriber coaxial cable network forms a shared media, a multiple access protocol is required to permit the devices 140 connected to the subscriber coaxial network access the ONU physical layer transceiver 120.

A number of multiple access protocols can be used including Frequency Division Multiple Access (FDMA), Code Division Multiple Access (CDMA) and Time Division Multiple Access (TDMA). When a TDMA protocol is used the devices will be assigned opportunities for the transmissions to the ONU physical layer transceiver 120, and, when ATM protocols are used, will transmit one or more cells in the opportunities. The TDMA protocol requires that the devices 140 transmit cells in a manner such that the data arriving at the ONU physical layer transceiver 120 from the devices 140 does not overlap in time. The TDMA technique is well understood by those skilled in the art.

Figure 2:
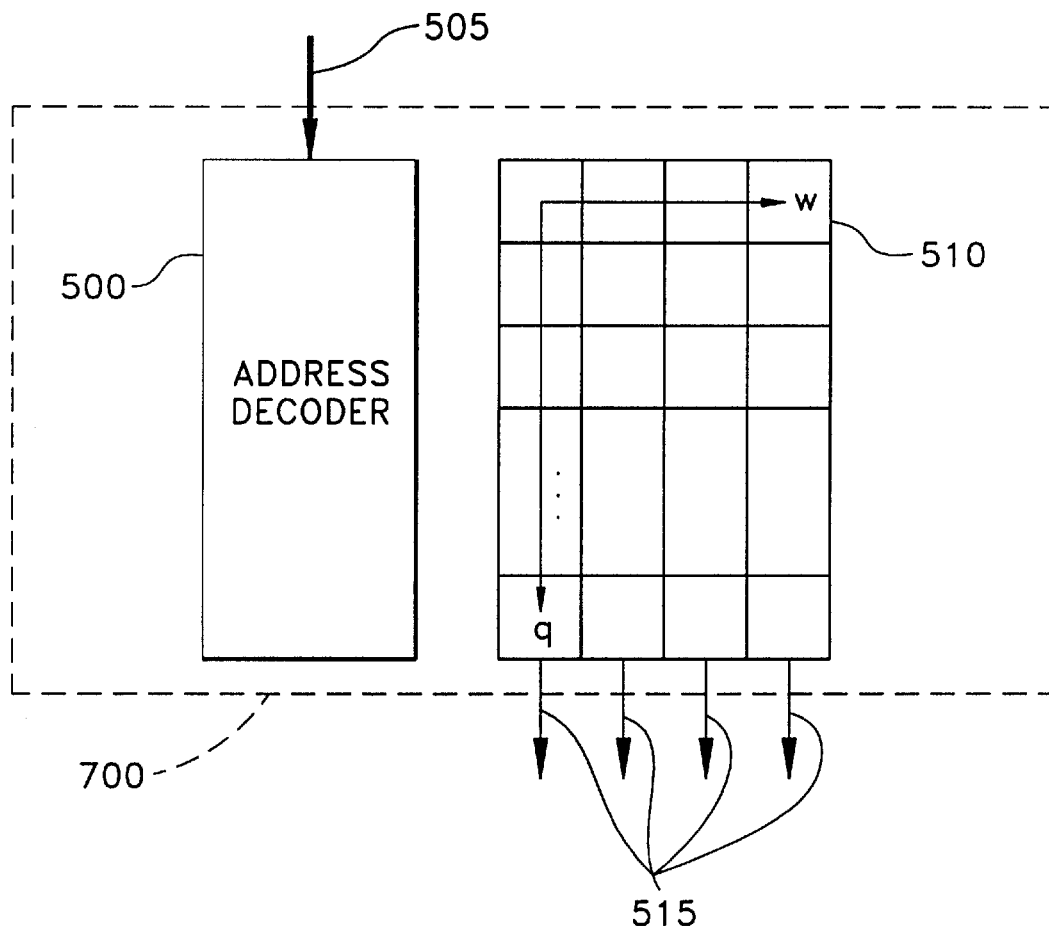
FIG. 2 shows a grant table.

A mechanism used to allow devices 140 to communicate with the ONU 110 by utilizing opportunities is a grant table 700 which is illustrated in FIG. 2. In a preferred embodiment the grant table 700 is located in ONU 110. The grant table 700 is composed of a grant table memory 510 and an address decoder 500. The address inputs 505 are stepped through such that the contents of the grant table memory 510 are read sequentially from the memory and appears at data outputs 515.

Grants for each device must be made at a rate which corresponds to the negotiated Quality of Service (QoS) for each virtual circuit connected to that device. Based on call connection requests, a number of virtual circuits are established over time which each have defined peak cell rates (PCRs) and sustained cell rates (SCRs) in both the upstream and downstream directions. Virtual circuits established for ABR (available bit rate) services may also include a minimum cell rate (MCR). Grants must be provided to each device at a rate high enough to accommodate the aggregate QoS requirements for all of the upstream virtual circuits from a given device.

Even though a given VBR virtual circuit will only output cells at its SCR over the long term, it is capable of outputting cells at its PCR over the short term. Since the ONU 110 cannot anticipate when this will occur, it must allocate grants for each VBR virtual circuit at the PCR—otherwise the virtual circuit would not be provided the negotiated QoS. Given that grants for each VBR virtual circuit must be generated at the PCR, the aggregate PCR for a device can be calculated by summing the PCRs for all of the CBR and VBR virtual circuits. To this aggregate must be added the MCR of all ABR virtual circuits, thus $$PCR_{device} = \sum_{i=0}^{n} PCR_{non\text{-}ABR\,VC(i)} + \sum_{j=0}^{m} MCR_{ABR\,VC(j)} \qquad (1)$$

where i and j are indices, n represents the number of non-ABR virtual circuits supported by the device, and m represents the number of ABR virtual circuits supported by the device.

Each device will have a signaling virtual circuit that allows for the connection and disconnection of other virtual circuits. In a preferred embodiment the signaling virtual circuit is an ABR circuit. Alternatively, the signaling channel has a constant data rate established by a CBR virtual circuit, or has a variable date rate established by using a VBR virtual circuit.

The MCR (or PCR) of this signaling virtual circuit will ensure that $PCR_{device}$ never falls to zero, even when no other virtual circuits are connected. This results in the issuance of periodic grants which form the signaling virtual circuit. The exact data rate of the signaling virtual circuit will depend on the application, and extremely low data rates (e.g. b/s) with long times between grants (e.g. seconds) will be adequate for some applications, while for other applications high data rates (e.g. 100s of kb/s) with short times (e.g. $\mu$s) between grants will be required.

In a preferred embodiment one grant table 700 exists per coaxial drop cable 210, and its contents simply indicate a sequence of device IDs which should, in order, be given grants. The ONU (110) continually progresses through the grant table from beginning to end, generating grants as it does.

Downstream and upstream frame structures can be used in a multiple access system such as that illustrated in FIG. 1, with grants being allocated in a downstream frame, and cells being transmitted in an upstream frame. Furthermore, a superframe can be defined as an integer number of frames. The upstream superframe length can be defined as $T_{sf\_up}$, and the downstream superframe length as $T_{sf\_down}$. Suitable values for the superframe lengths are $T_{sf\_up}=125$ $\mu$s and $T_{sf\_down}=125$ $\mu$s. In a preferred embodiment four upstream cells are transmitted every downstream superframe, with each cell corresponding to an upstream frame. In a preferred embodiment the downstream superframe is composed of a single frame. Four grants are transported downstream in a downstream frame and allow specific devices 140 to transmit upstream in the following frame.

The number of entries q in the grant table can be calculated as $$q = p \times k \qquad (2)$$

where k is an arbitrary constant which defines the granularity of the bandwidth which can be allocated to a particular device 140, and p is the number of upstream cells transmitted during a downstream superframe.

To determine an appropriate value for k it is useful to consider the minimum peak cell rate, $PCR_{min}$, which can be calculated as $$PCR_{min} = \frac{1}{(T_{sf\_up} \times k)} \left(\frac{cells}{s}\right) \qquad (3)$$

The minimum transport rate which results from the minimum peak cell rate can then be calculated as $$TR_{min} = PCR_{min} \times PL \qquad (4)$$

where PL is the cell payload in bits.

The variable r can be used to represent the number of entries in the grant table allocated for a specific device, and can be determined as $$r \geq \text{Int}\left\{\frac{PCR_{dev}}{PCR_{\min}}\right\} \quad (5)$$

where Int represents the integer function which results in the rounding up the value in brackets to the next highest integer value.

In a preferred embodiment four upstream cells are transmitted every 125 μs downstream superframe. The grant table has a depth of q=4 k, with the value of $PCR_{min}$ being 8,000/k cells per second, given that $T_{sf\_up}$ is equal to 125 μs. In a preferred embodiment the cell payload is equal to 384 bits, which results in a minimum transport rate of $TR_{min}$=3.072/k Mb/s.

A suitable design choice for k is 128, which results in a minimum transport rate of $TR_{min}$=24 kb/s, and a grant table with a depth of q=512 entries. Assigning a device the minimum transport (peak cell) rate results in $PCR_{dev}$= $PCR_{min}$ and r=1, with one entry in the grant table for that device. is corresponds to the transmission of one 384 bit cell from a device 140 every 16 ms.

In a preferred embodiment the device ID in each grant able entry can have 16 possible values:

0 indicating that an upstream cell opportunity can be used on a contention basis by all devices;

1 to 14 indicating that an upstream cell opportunity is to be used by the device 1 to 14 as specifically indicated; and 15 indicating that an upstream cell opportunity is not allocated, and that the upstream cell opportunity can be used for ABR virtual circuits.

This results in a grant table width, w, of 4 bits.

Based on the value for $PCR_{dev}$ for a given device, the number of grant table entries, r, required for that device can be calculated. Each of these r entries should have the device ID (1 to 14) of the corresponding device.

When a new virtual circuit is established between a device and the ONU, the $PCR_{dev}$ value for that device may increase. When this occurs r may also increase, and new grant table entries with the corresponding device ID should be added accordingly (replacing existing entries having a value of '15' with new entries corresponding to the device ID).

Figure 3:
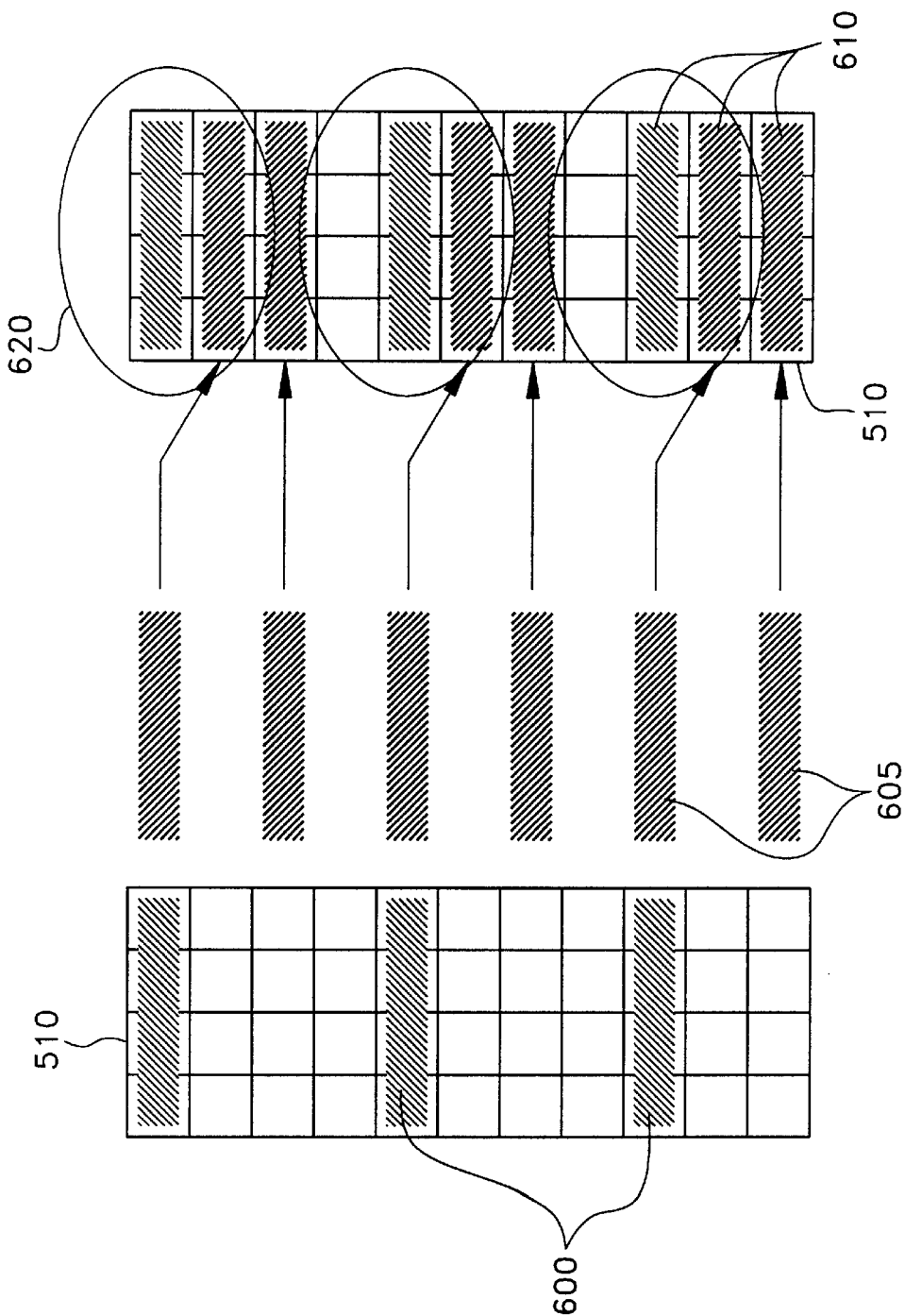
FIG. 3 illustrates a method of allocating grants for constant bit rate (CBR) and variable bit rate (VBR) services

As shown in FIG. 3, these new entries are determined and are recognized as the desired grant table locations 605. The ideal locations will be based upon fixed locations (at regular intervals) in the grant table memory 510, since the fixed locations at regular intervals result in minimized CDV.

These are the places where grants should occur in order to eliminate CDV. There may be existing grant table entries 600 in these locations. Grants are placed as close to these optimum locations as possible by examining the grant opportunities surrounding the optimal location in ever-increasing intervals. An interval which extends one location above or below the desired location is considered a first level search space 620. Alternate search spaces corresponding to locations further away from the ideal location can be used. The grants are placed in the first available slot, and the next optimum location is examined. When examining nearby opportunities at the edges of the table, the table is considered circular. The final grant allocations 610 correspond to the placement of the grants in such a manner that the CDV is minimized.

Figure 4:
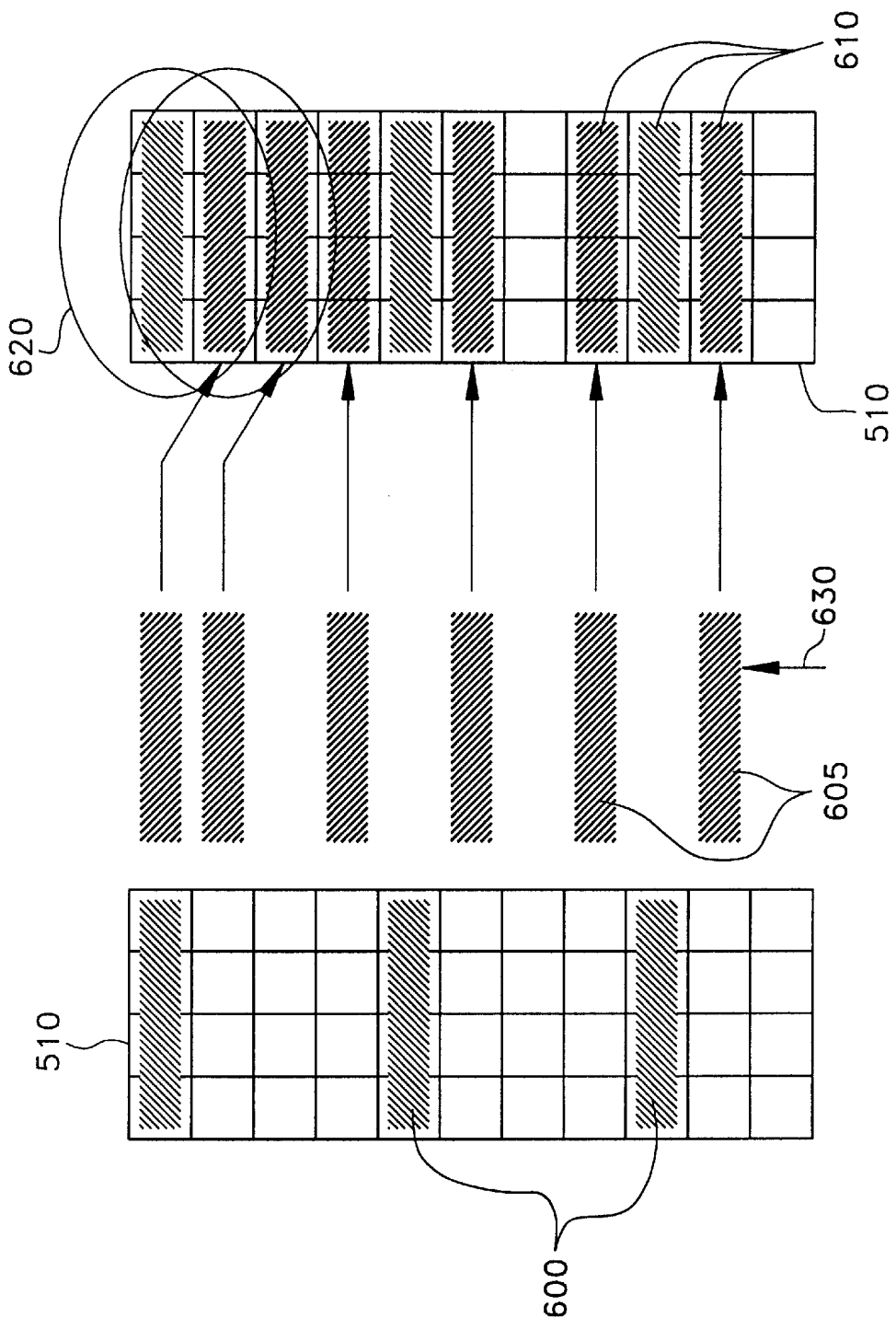
FIG. 4 illustrates a method of allocating grants for constant bit rate (CBR) and variable bit rate (VBR) services using an offset in the cell requests.

FIG. 4 illustrates how further improvement can be obtained by utilizing an offset 630 which results in better placement of the final grant allocations 610 based on the existing grant allocations 600 and the desired grant allocations 605 utilizing the first level search space 620.

The C++ algorithm shown in FIG. 6 implements the grant allocation process illustrated in FIG. 3.

When an existing virtual circuit between a device and the ONU is removed, the $PCR_{dev}$ value for that device is likely to decrease. When this occurs r may also decrease, and an appropriate number of grant table entries with the corresponding device ID should be removed by changing those entries to a value of '15'.

When the grant table has all of the required entries for each device, such that these grants result in an upstream cell rate for each device which is at least $PCR_{dev}$, the ONU may be able to provide additional grants in order to better support ABR virtual circuits. Specifically, for each unused grant table entry (indicated by a value of '15'), the ONU can allocate a grant to a device which has ABR cells waiting for transmission.

In order to provide optimal ABR support, the grants generated for ABR cells must be dynamically changeable. In particular, a means is required of altering the generated grants rapidly in response to knowledge of the ABR cell queue depths in the devices 140. Grants related to CBR and VBR virtual circuits, and to the ABR MCR requirement are not altered and remain static in the grant table to provide the negotiated QoS for each virtual circuit.

Figure 5:
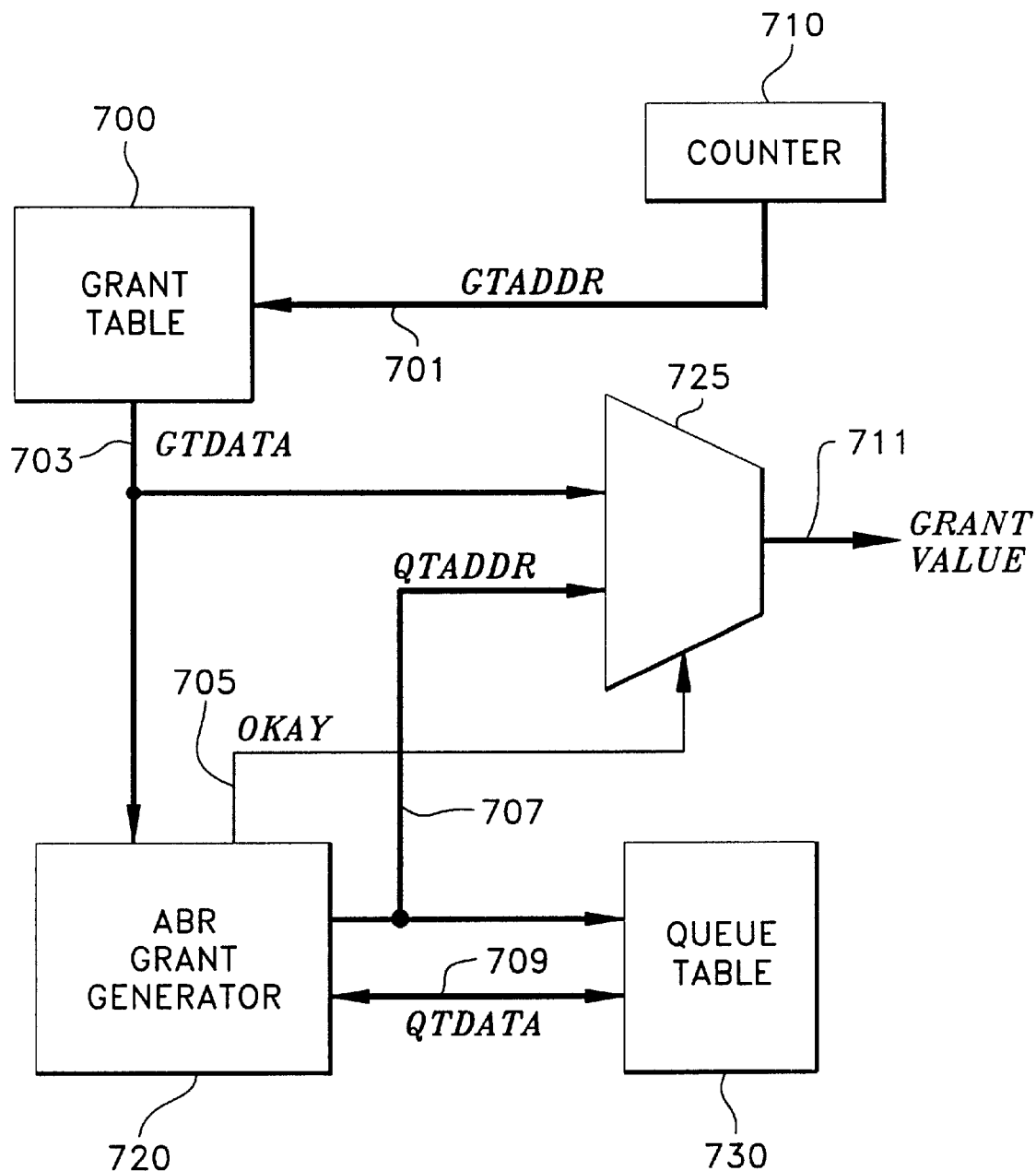
FIG. 5 illustrates a method of generating grants for available bit rate (ABR) services.

FIG. 5 illustrates a method and apparatus for generating ABR grants based on available grant table entries, and the requirement of a device 140 to transmit ABR cells. In a preferred embodiment, the grant table 700 and queue tables 730 are located in ONU 110. The method consists of a having a counter 710 which cycles through the grant table 700 illustrated in FIG. 2. The counter produces the grant table address GTADDR 701 which results in grant table data GTDATA 703 being read out. The GTDATA data 703 of FIG. 5 corresponds to the memory data outputs 515 of grant table 700 illustrated in FIG. 2. This data goes to a multiplexor 725, and a ABR grant generator 720.

Referring to FIG. 5, each device 140 reports on the number of ABR cells it has for transmission, this information being stored in a queue table 730. When the ABR grant generator 720 receives a grant which indicates that no device will transmit cells (corresponding to value '15'), it inspects the queue table 730 by sending a device ID on the queue table address, QTADDR line 707 and receiving a number on the queue table data, QTDATA line 709 which corresponds to the number of ABR cells that device 140 has in its ABR queue to transmit. If the device has ABR cells in this queue, the ABR grant generator 720 asserts the OKAY signal 705 which causes the multiplexer 725 to transmit the device ID on its output as a GRANT VALUE 711. In the event that the queue table 730 indicates that that particular device 140 does not have ABR cells in its ABR queue, it goes to the next device address to determine if that device has cells in its queue.

A method which describes this process, and which is equivalent in function to the circuit shown in FIG. 5, is shown in FIG. 7. It makes use of queue depth information from a single ABR queue in each device. Each device 140 reports on the status of an ABR queue, with the queue number of that queue constant throughout all devices 140. The ABR queue information carried in every upstream cell is used to update queue table 730 in the ONU. This table has an entry for each device ID which indicates the number of ABR cells awaiting transport from that device. In a preferred embodiment, the queue table 730 has a width of 4 bits and a depth of 14. In an alternate embodiment multiple queues can exist in each device with corresponding queue tables for each device The variable Xon in the method shown in Table II of FIG. 7 refers to a signal generated at a higher level which indicates whether or not ABR grants should be generated. Setting Xon equal to 'false' will prevent any ABR grants from being issued. The utility of having an Xon variable with 'true' and 'false' settings is that if there is not sufficient bandwidth in another part of the access system for ABR cells, setting Xon equal to 'false' will prevent devices 140 from transmitting ABR cells and prevent overflow of memories or First-In-First-Out (FIFO) structures in the system.

In a preferred embodiment an ABR queue is present in HDT 100, which receives cells transmitted from ONU 110 over optical fiber 200. When the ABR queue in HDT 100 is full, HDT 100 can set the Xon variable to 'false' which will prevent ABR grants from being issued to devices 140, as illustrated in FIG. 7.

Because there is a propagation delay between HDT 100 and ONU 110, there is a delay between when HDT 100 indicates that its ABR queue is full and when the last ABR cell from an ONU 110 arrives at HDT 100. This delay is equal to the round trip transport time between HDT 100 and the ONU 110 which is furthest away. The delay can result in an overflow of the HDT ABR queue since additional cells can arrive at HDT 100 even though the Xon signal has been set equal to 'false' and transmitted to the ONU 110.

In a preferred embodiment the delay can be accommodated by dimensioning the ABR queue size $Q_{HDT}$ in HDT 100 to be equal to $$Q_{HDT} = 2 \times c_{transit} \times SMR \quad (6)$$

where $C_{transit}$ is the maximum number of cells which can simultaneously exist in transit on the longest link between HDT 100 and ONU 110, and SMR is the statistical multiplexing region. The statistical multiplexing region should be large enough to account for the normal variations in the number of queued cells. If the statistical multiplexing region is too small, the ABR upstream flow from the ONU 110 will constantly be turned on and off, even during normal traffic conditions.

An application of the invention is the transmission of data from a device such as a computer located in residence 250 and connected to device 140 to ONU physical layer transceiver 120 located in ONU 110. The computer may be allocated bandwidth using an ABR mechanism in order to allow it to transmit a file to ONU 110 and on to HDT 100 for transmission to another computer which is connected to HDT 100 via a Public Switched Telecommunications Network (PSTN) or a private telecommunications network. The device 140 connected to the computer can be allocated grants using one of the embodiments of the present invention, such that the bandwidth on the subscriber coaxial network is effectively used. The effective use of the bandwidth becomes more important if there are other devices 140 in the same residence 250 which are utilizing CBR or VBR virtual circuits for applications such as telephony or video. In this case allowing the computer to utilize upstream cells not required for CBR or VBR services permits all devices in the home to be used simultaneously and does not waste cells by establishing a CBR or VBR virtual circuit for the computer file transfer when an ABR virtual circuit is adequate.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. In a cell based communications network having a physical layer where said physical layer has a transceiver of a first type connected to at least one transceiver of a second type, a method of allocating bandwidth on said physical layer, said method comprising the steps of;

a) constructing a grant table in said transceiver of a first type wherein said grant table contains grants corresponding to cell opportunities for transmission of cells from said transceiver of a second type to said transceiver of a first type over said physical layer;

b) determining the number of said grants required in said grant table to allow said transceiver to transmit cells at a specified rate of transmission;

c) generating multiple grants in said grant table wherein said multiple grants have addresses associated with said transceiver of a second type;

d) optimizing locations of said multiple grants in said grant table to minimize variations in the spacing of said multiple grants and reduce the cell delay variation in the transmission of cells from said transceiver of a second type to said transceiver of a first type;

e) determining optimum locations for said multiple grants to realize said specified rate of transmission;

f) examining said grant table to determine if grants exist in said optimum locations;

g) determining first possible locations for said multiple grants;

h) offsetting said optimum locations by an integer number of grant locations;

i) determining alternate possible locations for said multiple grants; and j) selecting final grant locations from said first possible locations and said alternate possible locations.

2. In a cell based communications network having a physical layer where said physical layer has a transceiver of a first type connected to at least one transceiver of a second type, a method of allocating bandwidth on said physical layer, said method comprising the steps of:

a) constructing a grant table in said transceiver of a first type wherein said grant table contains grants corresponding to cell opportunities for transmission of cells from said transceiver of a second type;

b) transmitting a data field from said transceiver of a second type to said transceiver of a first type wherein said data field represents the number of cells stored in said transceiver of a second type awaiting transmission to said transceiver of a first type on an available bit rate basis;

c) constructing a queue table in said transceiver of a first type wherein said queue table indicates the number of cells requiring transmission from said transceiver of a second type to said transceiver of a first type;

d) determining whether said grant table has an entry which indicates that a cell opportunity is unused;

e) determining whether said queue table in said transceiver of a first type has at least one entry indicating that at least one cell is awaiting transmission from said transceiver of a second type; and f) generating a grant having an address corresponding to an address of said transceiver of a second type;

g) constructing a plurality of queue tables in said transceiver of a first type wherein said plurality of queue tables indicate the number of cells requiring transmission from said plurality of transceivers of a second type.

3. The method described in claim 2 further comprising the step of:

h) when the queue table corresponding to a first respective transceiver of a second type does not have an entry indicating that at least one cell is awaiting transmission from said first respective transceiver of a second type, determining whether the queue table corresponding to a second respective transceiver of a second type has an entry indicating that at least on cell is awaiting transmission from said second respective transceiver of a second type.

4. The method described in claim 3 further comprising the step of:

i) cycling through the queue tables of each of said plurality of transceivers of a second type in a sequential manner to determine which transceivers of a second type has at least one entry indicating that at least one cell is awaiting transmission from said transceiver of a second type.

5. In a cell based communications network having a physical layer where said physical layer has a transceiver of a first type connected to at least one transceiver of a second type, an apparatus for allocating bandwidth on said physical layer, said apparatus comprising:

a) means for constructing a grant table in said transceiver of a first type wherein said grant table contains grants corresponding to cell opportunities for transmission of cells from said transceiver of a second type to said transceiver of a first type over said physical layer;

b) means for determining the number of said grants required in said grant table to allow said transceiver to transmit cells at a specified rate of transmission;

c) means for generating multiple grants in said grant table wherein said multiple grants have addresses associated with said transceiver of a second type; and d) means for optimizing locations of said multiple grants in said grant table to minimize variations in the spacing of said multiple grants and reduce the cell delay variation in the transmission of cells from said transceiver of a second type to said transceiver of a first type;

e) means for determining optimum locations for said multiple grants to realize said specified rate of transmission;

f) means for examining said grant table to determine if grants exist in said optimum locations;

g) means for determining first possible locations for said multiple grants;

h) means for offsetting said optimum locations by an integer number of grant locations;

i) means for determining alternate possible locations for said multiple grants; and j) means for selecting final grant locations from said first possible locations and said alternate possible locations.

6. In a cell based communications network having a physical layer where said physical layer has a transceiver of a first type connected to at least one transceiver of a second type, an apparatus for allocating bandwidth on said physical layer, said apparatus comprising the steps of:

a) means for constructing a grant table in said transceiver of a first type wherein said grant table contains grants corresponding to cell opportunities for transmission of cells from said transceiver of a second type;

b) means for transmitting a data field from said transceiver of a second type to said transceiver of a first type wherein said data field represents the number of cells stored in said transceiver of a second type awaiting transmission to said transceiver of a first type on an available bit rate basis;

c) means for constructing a queue table in said transceiver of a first type wherein said queue table indicates the number of cells requiring transmission from said transceiver of a second type to said transceiver of a first type;

d) means for determining whether said grant table has an entry which indicates that a cell opportunity is unused;

e) means for determining whether said queue table in said transceiver of a first type has at least one entry indicating that at least one cell is awaiting transmission from said transceiver of a second type; and f) means for generating a grant having an address corresponding to an address of said transceiver of a second type;

g) means for constructing a plurality of queue tables in said transceiver of a first type wherein said plurality of queue tables indicate the number of cells requiring transmission from said plurality of transceivers of a second type.

7. The apparatus described in claim 6 further comprising:

h) means for determining when the queue table corresponding to a first respective transceiver of a second type does not have an entry indicating that at least one cell is awaiting transmission from said first respective transceiver of a second type; and i) means for determining whether the queue table corresponding to a second respective transceiver of a second type has an entry indicating that at least on cell is awaiting transmission from said second respective transceiver of a second type.

8. The apparatus described in claim 7 further comprising:

j) means for cycling through the queue tables of each of said plurality of transceivers of a second type in a sequential manner to determine which transceivers of a second type has at least one entry indicating that at least one cell is awaiting transmission from said transceiver of a second type.

\* \* \* \* \*